(12) United States Patent
Woo

(10) Patent No.: US 6,604,147 B1
(45) Date of Patent: Aug. 5, 2003

(54) SCALABLE IP EDGE ROUTER

(75) Inventor: Thomas Y Woo, Red Bank, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/567,371

(22) Filed: May 9, 2000

(51) Int. Cl.[7] .......................... G06F 13/00; H04L 12/28
(52) U.S. Cl. ........................ 709/240; 709/238; 370/351
(58) Field of Search .................. 709/200, 201, 709/203, 217, 218, 219, 232, 238, 239, 240, 241, 242; 370/401, 409, 351

(56) References Cited

U.S. PATENT DOCUMENTS

| | | | | |
|---|---|---|---|---|
| 5,572,533 A | * | 11/1996 | Sunada et al. ............... | 370/245 |
| 6,009,528 A | * | 12/1999 | Teraoka ........................ | 709/239 |
| 6,262,983 B1 | * | 7/2001 | Yoshizawa et al. ......... | 370/351 |
| 6,292,489 B1 | * | 9/2001 | Fukushima et al. ......... | 370/401 |
| 6,292,836 B1 | * | 9/2001 | Teraoka ........................ | 709/236 |
| 6,353,614 B1 | * | 3/2002 | Borella et al. ............... | 370/389 |
| 6,421,734 B1 | * | 7/2002 | Nessett et al. ............... | 709/247 |
| 6,510,164 B1 | * | 1/2003 | Ramaswamy et al. ...... | 370/466 |

* cited by examiner

Primary Examiner—Moustafa M. Meky

(57) ABSTRACT

In a data communications network, an edge router comprises a buffer for storing data packets, one or more line interface cards for routing data packets to and from the data communications network, and a processing engine for processing a limited portion of each packet that has been captured by an associated line interface card in a packet tag. The processing engine includes one or more pipeline processing modules (PPMs) which may be dynamically configured by a system controller to perform specific processing functions in a pipelined arrangement. In order to increase edge router throughput, each packet tag is processed by the processing engine essentially in parallel with storage of the associated data packet in the buffer by the associated line interface card.

37 Claims, 10 Drawing Sheets

EDGE ROUTER DATA PACKET PROCESSING

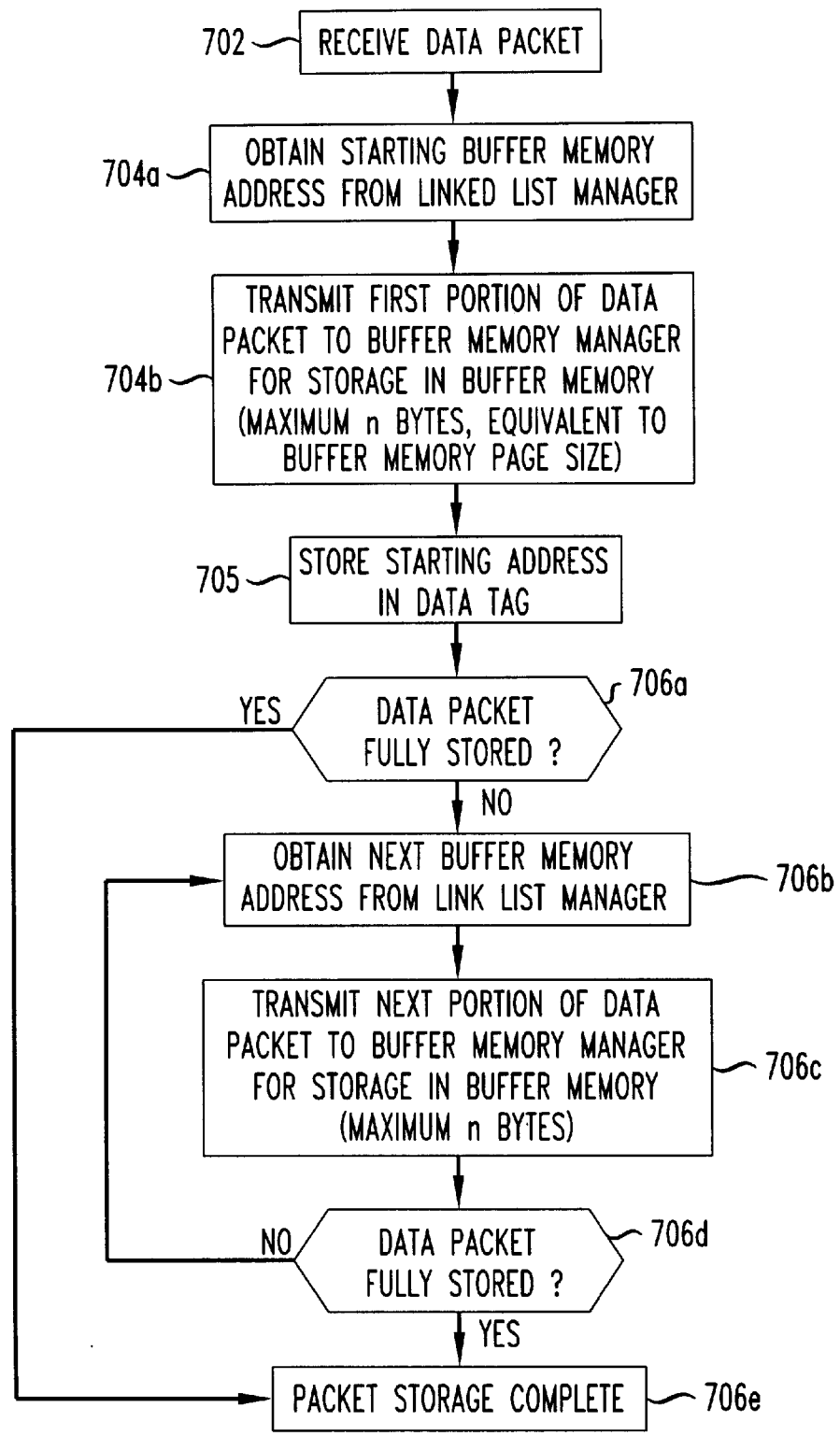

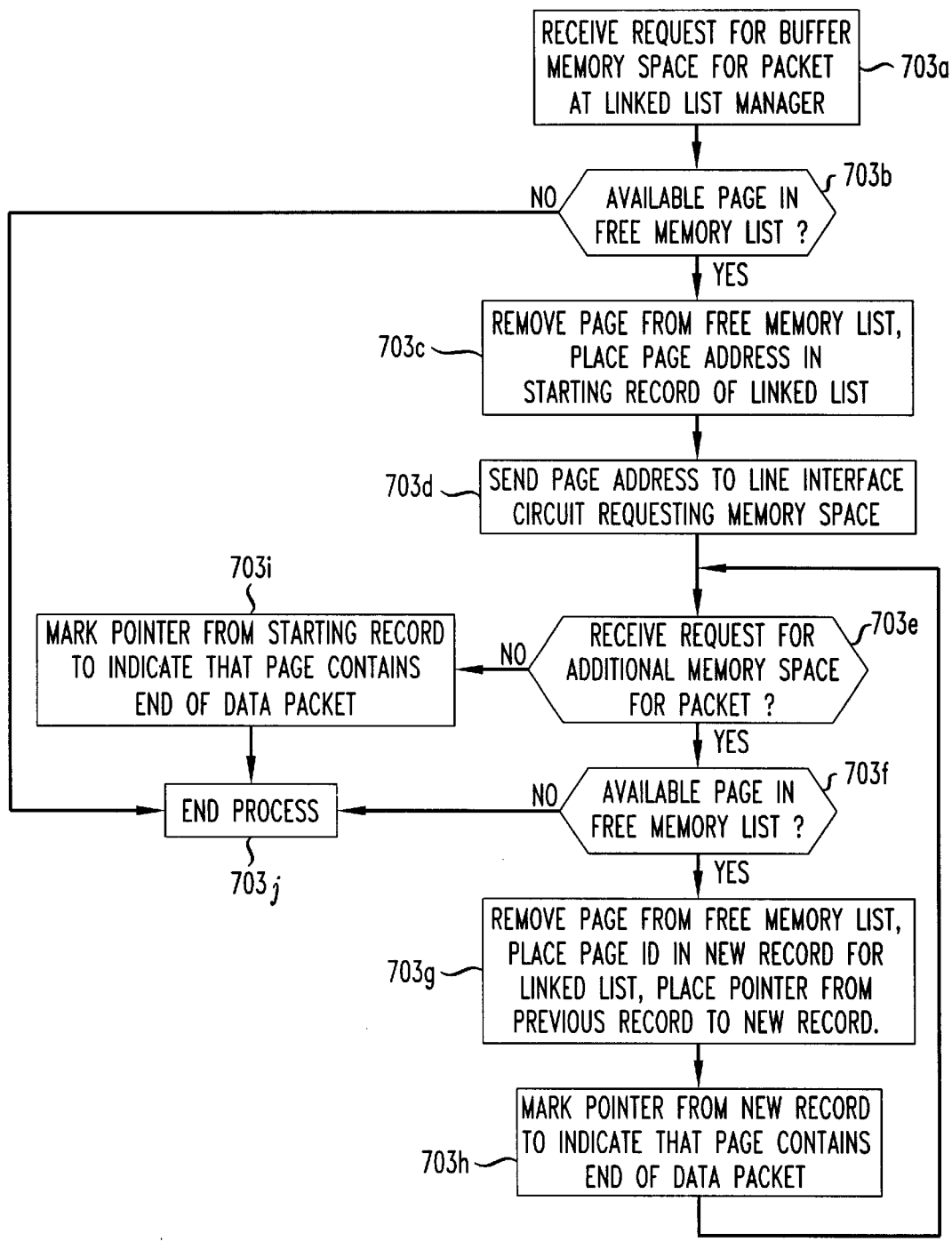

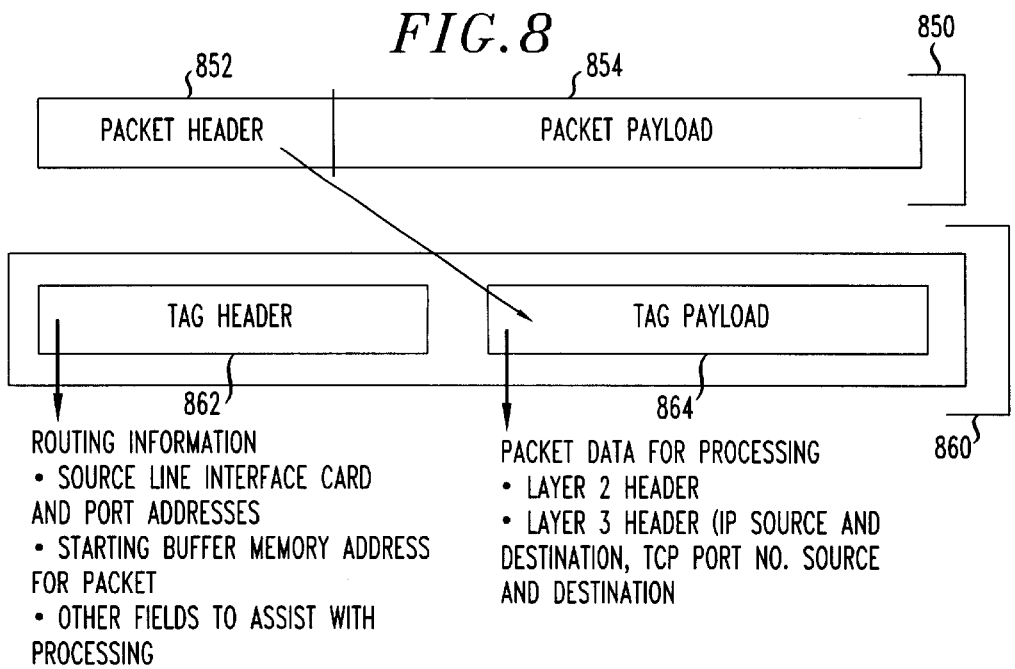
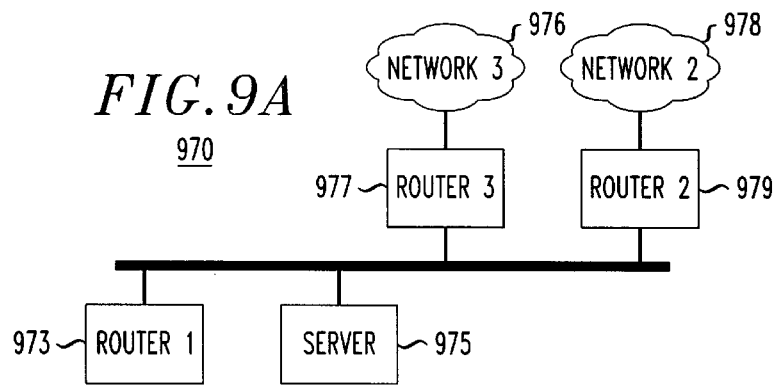
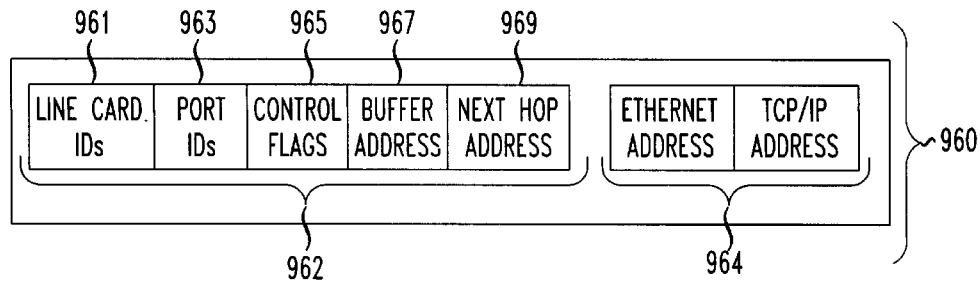

SCALABLE IP EDGE ROUTER

FIELD OF THE INVENTION

This invention relates to data communications routers, and more particularly, to a scalable architecture for enterprise-class data communications routers.

BACKGROUND OF THE INVENTION

Enterprise-class data communications networks serve a varied class of users having both local-area and wide-area networking needs. FIG. 1 depicts a typical enterprise class network 102. Enterprise-class routers are typically deployed at two positions in the network. An enterprise backbone router (EBR) 104 provides data packet routing among a plurality of local area subnetworks (intranets). The EBR functions primarily to provide efficient routing of packets travelling between the intranets.

In addition to the EBR, an enterprise edge router (EER) 100 functions primarily to concentrate data traffic arriving from one or more interconnected enterprise intranets so that this traffic may be efficiently forwarded over T1 or other wide area data communications facilities to an access provider edge router 114. The access provider edge router 114 typically routes enterprise traffic to one or more internet service providers (ISPs) for transport to other networks.

In addition to concentrating data traffic from a number of interconnected intranets, the EER 102 may provide a variety of value-added functions including but not limited to packet recognition, packet filtering, packet classification for quality of service (QoS) features, internet protocol (IP) address look-up and translation, buffer management, packet scheduling, data encryption and compression, load balancing, traffic monitoring, traffic billing and multicast support. The bundle of such functions provided in a given enterprise application will depend on the size and nature of the application. For example, an enterprise network deployed in a public school may comprise a small number of intranets with basic features and low-bandwidth concentration (often, for example, at fractional T1 rates). In sharp contrast, an enterprise network deployed by a large commercial enterprise such as a financial institution may comprise a large intranet base with more sophisticated features and with high-bandwidth concentration (often at T3 and OC3 rates). Also, intranet architectures and data protocols will vary widely with enterprise class. For example, banking networks may support "legacy" protocols such as IPX and SNA, while "internet company" networks may be based entirely on IP protocols.

FIG. 2 illustrates a typical architecture used currently for edge routers. The edge router 200 of FIG. 2 includes a central processing unit (CPU) 206, a memory 208, and one or more line interface cards 212, each interconnected by a bus 216. Each line interface card 212 further includes a local memory 213.

In the edge router 200 of FIG. 2, an arriving packet is received at a line interface card 212 and stored in an associated local memory 213. The line interface card 212 then signals the CPU 206 that a packet has arrived for processing. In response, the CPU 206 retrieves the stored packet and places it in the memory 208. The CPU 206 processes the packet (for example, by computing a "next hop" address for the packet on the basis of the packet's end destination address). After the packet is processed, the CPU 206 selects a line interface card 212 to be used to transmit the processed packet from the edge router 204, retrieves the stored packet, and transfers the retrieved packet to the selected line interface card 212 for transmission to the next hop address.

Because the CPU 206 may be programmed to perform a variety of functions, the router architecture illustrated in FIG. 2 provides significant flexibility. However, router performance and capacity will be strongly dictated by the performance characteristics of individual router components such as the CPU 206, the memory 208 and the bus 216. As a result, to serve a variety of application environments, router manufactures employing this architecture are generally forced to provide a variety of different router products. This creates inefficiency for the router manufacturers, as well as added cost for enterprises that are forced to replace routers as their networks grow in size and their feature requirements change.

Accordingly, it would be desirable to develop a more flexible router architecture that allows a variety of enterprise network feature and capacity requirements to be more easily met.

SUMMARY OF THE INVENTION

Improved flexibility in features and performance is achieved by an improved architecture for enterprise data communications routers. According to a first embodiment of the invention, the architecture comprises a buffer for storing data packets, a processing engine for processing information associated with the stored data packets, and one or more line interface cards (LICs) each having one or more ports for receiving and transmitting data packets. Source LICs receive data packets at source ports, store received packets in the buffer, and transmit packet tags incorporating a selected subset of information from the data packets to the processing engine for processing. Packet storage and tag processing are accomplished largely in parallel for improved router efficiency.

The processing engine processes and transmits the processed packet tags to destination LICs. The destination LICs, in response to information contained in processed tags, retrieve associated data packets from the buffer, modify the retrieved data packets, and deliver the modified data packets to associated LIC destination ports.

In a second embodiment of the invention, the processing engine further includes one or more serially arranged pipeline processing modules (PPMs) to process the header information. The serially arranged PPMs are each programmed to perform a dedicated processing function. In addition, a system controller is coupled to the serially arranged PPMs to receive and process header information associated with control and signaling data packets, and to dynamically update stored program control software in the serially arranged PPMs.

BRIEF DESCRIPTION OF THE DRAWING

A more complete understanding of the invention may be obtained by reading the following description of specific illustrative embodiments of the invention in conjunction with the appended drawing in which:

FIGS. 7A and 7B show process flow diagrams for storing received packets in the buffer of FIG. 3A;

FIG. 8 depicts a packet tag created according to the process of FIG. 4; and

FIGS. 9A–9E illustrate three applications of the invention according to the embodiments described by FIGS. 3A and 3B.

Figure 1:
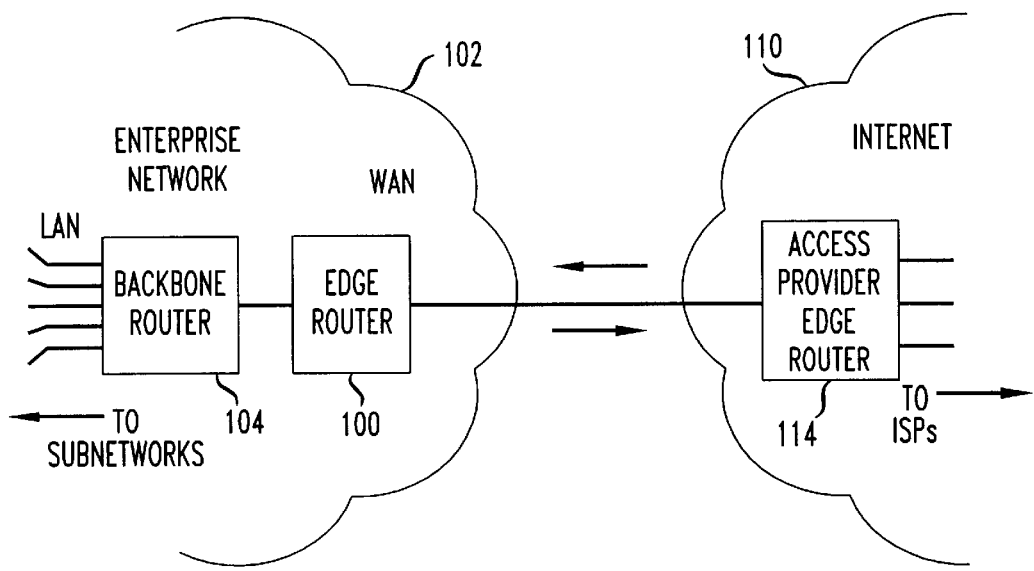
FIG. 1 depicts a typical enterprise network employing edge and backbone routers.
Figure 2:
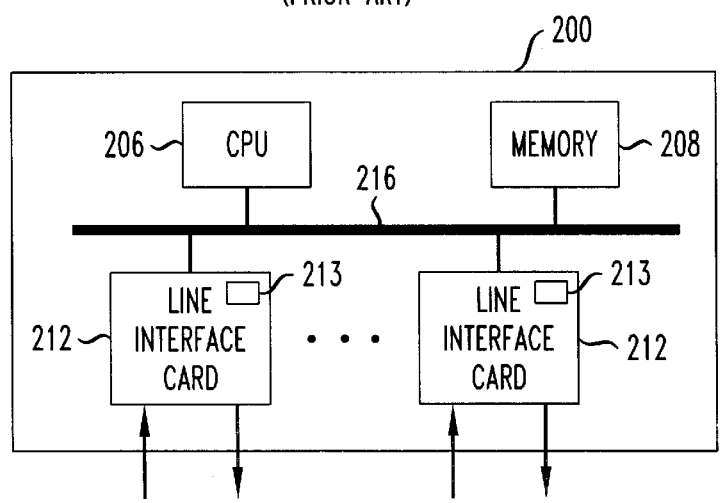
FIG. 2 shows a schematic diagram illustrating a prior art architecture for edge routers.

For consistency and ease of understanding, those elements of each figure that are similar or equivalent share identification numbers that are identical in the two least significant digit positions (for example, edge router 100 of FIG. 1 and edge router 200 of FIG. 2).

DETAILED DESCRIPTION

Figure 3A:
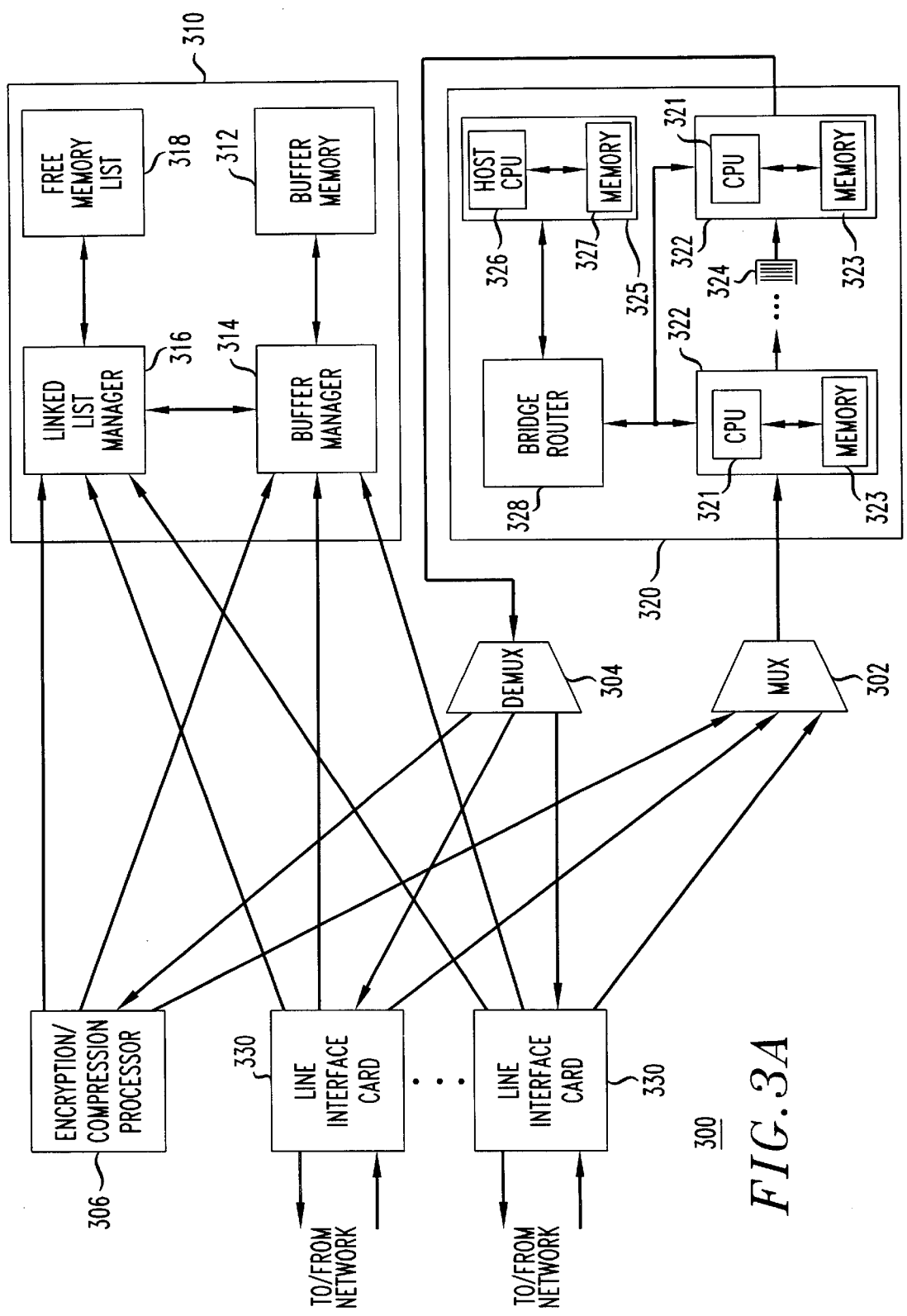
FIGS. 3A and 3B show schematic diagrams illustrating two embodiments of the present invention.

An embodiment of the present invention is illustrated as edge router 300 of FIG. 3A. Edge router 300 comprises a buffer 310 for storing received data packets, a processing engine 320 for processing header information associated with the received data packets, and one or more line interface cards 330 for receiving and transmitting data packets over associated data network terminations.

Figure 4:
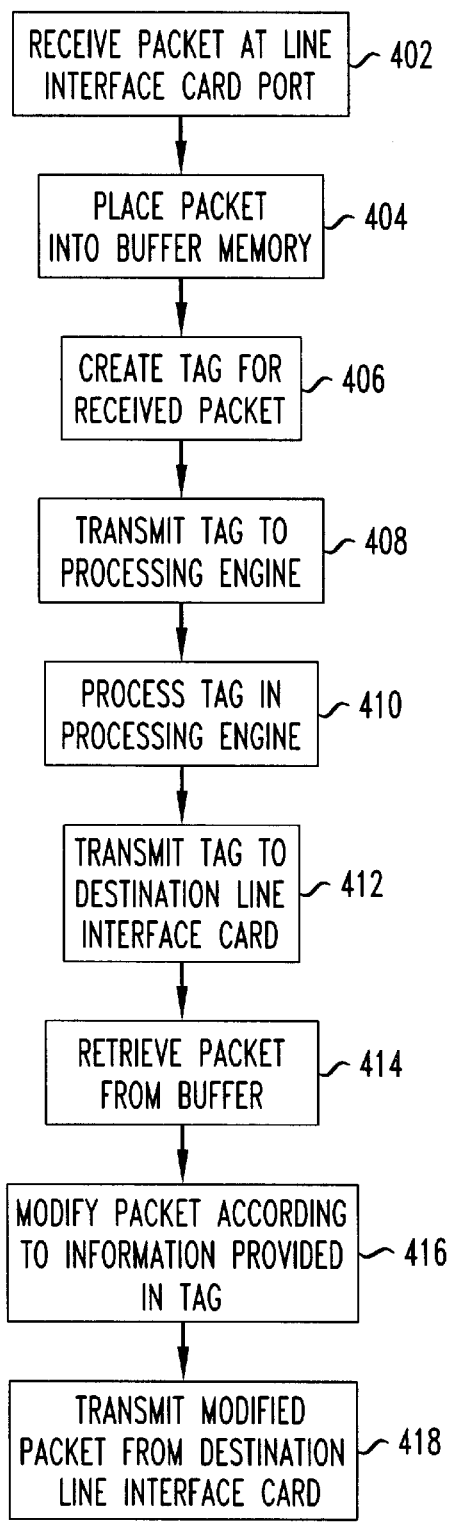
FIG. 4 shows a process flow diagram illustrating the operation of the embodiment of FIGS. 3A.

Operation of the edge router 300 is summarized with reference to FIG. 3A and the process flow diagram of FIG. 4. At step 402 of FIG. 4, a data packet is received at a network termination port in one of the line interface cards (LICs) 330. LIC 330 places the received packet in buffer 310 at step 404, and creates a tag for the received packet at step 406. The packet includes information copied from the received packet, and in particular, from the packet header.

At step 408, LIC 330 transmits the tag to processing engine 320. Processing engine processes the packet tag at step 410, and then transmits the processed packet tag to a destination LIC 330 at step 412. Destination LIC 330 may be the LIC 330 that received the packet initially, or another one of the one or more LICs 330.

At step 414, destination LIC 330 identifies the subject data packet from information in the processed packet tag, and retrieves the subject data packet from the buffer. Destination LIC 330 then uses information in the processed packet tag to modify the retrieved data packet. For example, destination LIC 330 may replace a destination address in the retrieved data packet with a revised destination address contained in the packet tag. After completing packet modifications, destination LIC 330 transmits the modified data packet from a LIC network termination port at step 418.

According to the method of FIG. 4, and in contrast to the prior art architecture illustrated in FIG. 2, the edge router 300 of FIG. 3 requires only a portion of each received data packet to be processed by its central processing unit (processing engine 320). This portion to be processed is encapsulated by the receiving LIC 330 in a packet tag. Importantly, this allows for increased efficiency over the prior art architecture of FIG. 2, as tag processing by processing engine 320 proceeds largely in parallel with storage of the received data packet by LIC 330 and buffer 310.

Figure 5:
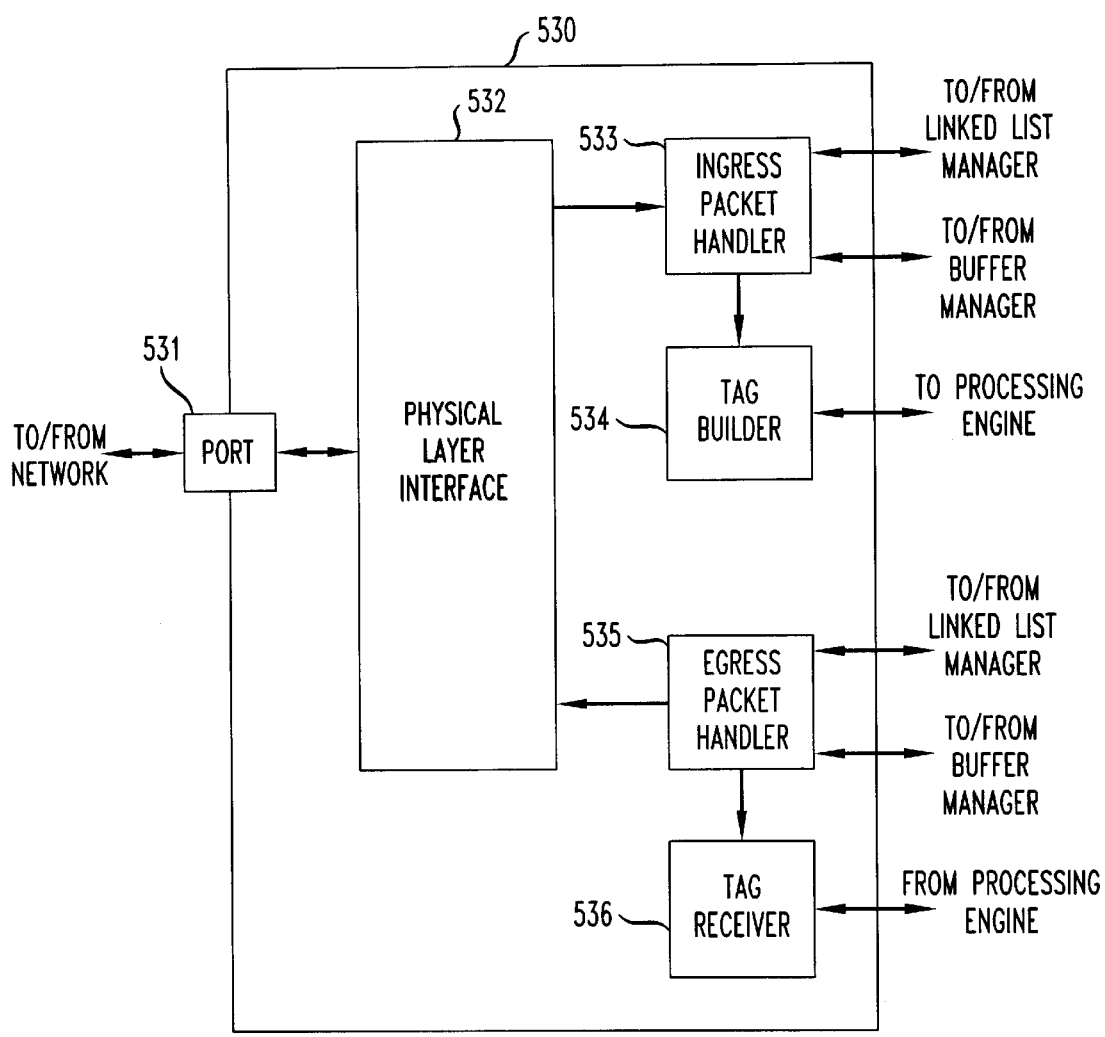
FIG. 5 shows a schematic diagram of line interface card elements according to the embodiment of FIG. 3A.

Elements of line interface circuits 330 are illustrated with greater particularity in FIG. 5. Line interface circuit 530 of FIG. 5 includes one or more ports 531 that each provide a physical termination between the line interface circuit 530 and a path in the data network. Port 531 is interconnected to a physical layer interface 532, which operates both to condition received data packets for processing in the router 300 of FIG. 3 and to condition data packets processed by the router 300 for transmission over the data network. The conditioning provided by physical layer interface 532 includes, for example, converting between packet bit streams in the router 300 and signal formats particular to the interconnecting network or subnetwork. For example, a LIC 330 interconnecting an Ethernet-based subnetwork would include an Ethernet transceiver in physical layer interface 532. Ethernet transceivers of this sort are commercially available, for example, such as the Intel 82559 Ethernet controller.

Received packets are transferred by the physical layer interface 532 to ingress packet handler 533, which interacts with the buffer 310 of FIG. 3 to store the received packet. In parallel with data packet transfer to ingress packet handler 533, packet tag builder 534 retrieves information from the received data packet, encapsulates the retrieved information within a packet tag, and transmits the packet tag to a processing engine 320 of FIG. 3 for further processing.

Tag information processed by processing engine 320 is received by tag receiver 536 of FIG. 5. Tag receiver 536 interprets the processed packet tag and instructs egress packet handler 535 to retrieve an associated data packet from buffer memory 310 of FIG. 3. Egress packet handler 535 may be further instructed by packet tag receiver 536, to modify the retrieved packet (for example, by replacing information in a destination field with information included in the processed packet tag). Egress packet handler 535 modifies the retrieved packet and provides the modified packet to physical layer interface 532 for conditioning and transmission over port 531. Packet handlers 533 and 535, tag builder 534 and tag receiver 536 may be readily implemented as field programmable gate arrays (FPGAs).

As illustrated in FIG. 3A, packet tags transmitted to processing engine 320 by LICs 330 are serially sequenced by multiplexer 302. Similarly, packet tags processed by processing engine 320 are demultiplexed by demultiplexer 304 and provided appropriately to destination LICs. In order to reduce the possibility of resource contention, the multiplexer 302 and the demultiplexer 304 to may be equipped with buffers for each interfacing LIC 330. Multiplexer 302 and demultiplexer 304 536 may also be readily implemented as FPGAs.

Another important aspect of the present invention concerns the architecture of processing engine 320. Processing engine 320 incorporates an innovative "pipeline" architecture incorporating one or more pipeline processing modules (PPMs) 322 and system controller 325. Each PPM 322 includes a central processing unit (CPU) 321 and a memory 323. CPU 321 may consist of a commercially available processor such as Motorola's POWERPC 750. Memory 323 may be configured using conventional dynamic random access memory (DRAM). Optionally, each PPM may incorporate a multiprocessor in place of CPU 321.

The memory 323 contains stored program control instructions for the CPU 321, and may also contain data associated with the processing of packet tags. PPMs 322 are chained together in a serial ("pipelined") fashion, optionally separated by one or more first-in-first-out (FIFO) buffers 324 to manage slight asynchronies in the operation of PPMs 322. Suitable buffers are commercially available, for example, from Integrated Device Technology, Inc.

As a consequence of this architecture, and in sharp contrast to the prior art architecture of FIG. 2, the number of PPMs employed and the breakdown of functions performed by each PPM may be easily and flexibly tailored according to specific user requirements.

In addition to the one or more PPMs 332, processing engine includes a system controller 325. System controller 325 includes a Host CPU 326 and a memory 327 containing stored program control and data elements, and may be programmed, for example, to dynamically download stored program control instructions and data to one or more of the PPMs 322 via a pipeline bus 329. System controller 325 may also retrieve data from one or more of the PPMs 322 via pipeline bus 329. Pipeline bus 329 also enables data transfer between memories 323 in two or more of the PPMs 322.

Optionally, system controller 325 may be interconnected to pipeline bus 329 via bridge router 328. This optional configuration has the advantage, for example, of reducing traffic reaching system controller 325 that pertains only to PPMs 322. Bridge router 328 may be implemented, for example, using commercially available devices such as the Motorola MPC106 PCI Bridge/Memory Controller or IBM CPC700 PCI Bridge.

Figure 3B:
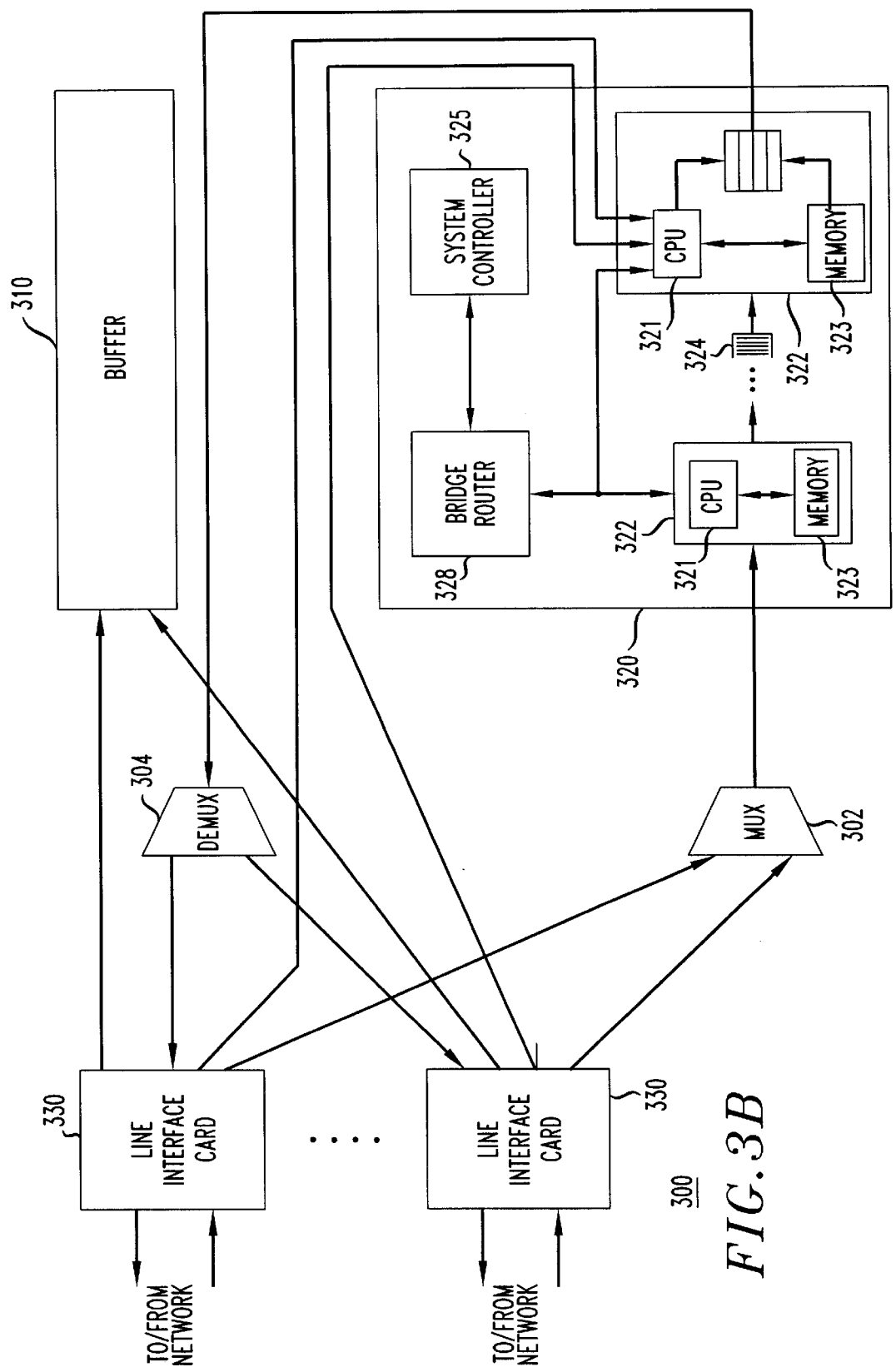

As illustrated by FIG. 3B, LICs 330 are further interconnected to processing engine 320 via signal paths 337. As shown in FIG. 3B, signal paths 337 interconnect to a PPM 322' positioned at a downstream end of the pipeline for the purpose of signaling processing engine 320 when each LIC 330 is ready to receive one or more processed packet tags. One skilled in the art will readily recognize that signal paths 337 may alternatively interconnect to a variety of other components (for example, system controller 325) in processing engine 320 to provide this function.

As shown in FIG. 3B, end of pipeline LIC 322' also includes one or more queues 339 that may be used to sequence the delivery of processed packet tags to the LICs 330 according to the placement of packet tags in the one or more queues 339. Queues 339 may transfer packet tags to demultiplexer 304 in a "round robin" manner, or alternatively, according to various schemes granting different priorities to ones of the one or more queues 339. A queue may be selected for a packet tag on the basis of an assigned priority recorded in the packet tag. For example, a priority scheme may be constructed allowing very low latency for a class of packet tags associated with "voice over IP" packets. The significance of this queueing feature is discussed in greater detail for two examples illustrated by FIGS. 9C through 9E.

Edge router 300 of FIG. 3A may also optionally include an encryption/compression processor 306. Suitable encryption/decryption processors are commercially available, for example, from Hi/fn Inc.

Several elements of buffer 310 enable efficient storage and retrieval of data packets. Buffer 310 includes a buffer memory 312 that stores data packet information, a buffer manager 314 that controls access to portions of the buffer memory 312, a linked list manager 316 that tracks areas of buffer memory (termed "pages") that are allocated to store data packet information, and a free memory list that keeps track of empty buffer memory pages which are available to be assigned for data packet storage. The operation of buffer 310 is further illustrated with additional reference to FIGS. 3A, 5 and 6.

Figure 6:
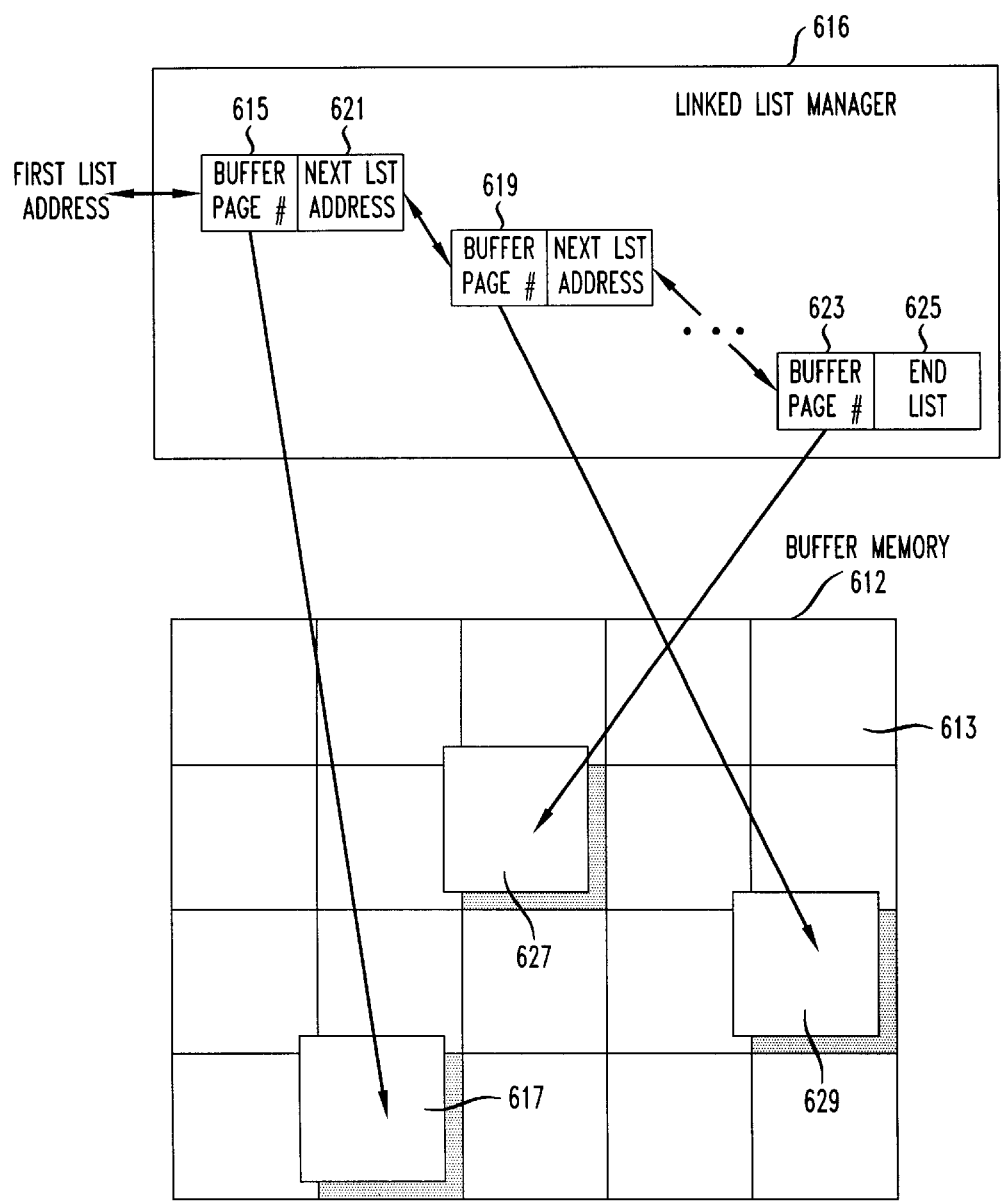
FIG. 6 illustrates the relationship between the linked list manager and the buffer memory of the embodiment of FIG. 3A.

Upon receipt of a data packet, ingress packet handler 533 of FIG. 5 communicates a request to linked list manager 316 of FIG. 3A for a page in buffer memory 312 to begin storing the data packet. In response to this request, linked list manager 316 communicates with free memory list 318 to determine a starting page in buffer memory 312 for storing at least a portion of the data packet, and records the memory address as a starting memory address for the data packet. As shown in FIG. 6, buffer memory 612 includes an array of buffer memory pages 613 that may be allocated for storing data packets. In a buffer memory capable of storing between 32 and 128 megabytes of packet data, for example, each buffer memory page 613 may be configured to store 64 bytes of packet data.

Linked list manager 316 of FIG. 3 communicates the page number of starting page 617 of FIG. 6 to buffer manager 314, records the starting page number in a linked list record 615, and signals ingress packet handler 533 of FIG. 5 to begin transmitting up to 64 bytes (one buffer memory page) of packet data to buffer manager 314. Buffer manager 314 writes the data provided by ingress packet handler 533 to memory page 617, and communicates the starting memory address recorded in record 615 to ingress packet handler 533. Ingress packet handler 533 communicates the starting address to tag builder 534, where it is incorporated in the packet tag.

If the data packet has not yet been fully stored in buffer memory 312, packet handler 533 of FIG. 5 communicates another request to linked list manager 316 of FIG. 3 for memory space. Linked list manager queries free memory list 318 to obtain the address for a new empty buffer memory page 627, creates a record 619 identifying the associated address, and establishes a pointer 621 in record 615 linking record 615 to record 619.

Requests for additional buffer memory pages continue until the data packet has been completely stored in buffer memory 613. As illustrated in FIG. 6, record 623 stores the address for a final buffer memory page 629. The pointer field 625 of the record 623 is marked to indicate that record 623 is the last record in the linked list of records 615, 619 and 623.

The interaction between LICs 330 of FIG. 3 and buffer 310 in storing a received data packet is further shown in the flow diagrams of FIGS. 7A and 7B. FIG. 7A depicts action taken by one of the LICs 330 to store a received data packet. After receiving a data packet at step 702, a LIC 330 at step 704a makes a request to linked list manager 316 to obtain a starting page address for placing the packet in buffer memory 312. After the starting address is received, LIC 330 transmits a first portion of the data packet at step 704b to buffer manager 314 for storage at the starting page (page 617 of FIG. 6) in buffer memory 312 of FIG. 3A. The transmitted portion may not exceed the capacity of the selected buffer memory page. At step 705, LIC 330 stores the starting address of the selected buffer memory page within the packet tag it is preparing to transmit to processing engine 320. The packet tag thereby is later delivered to a destination LIC 330 with the starting buffer memory address for retrieving the associated data packet.

After transmitting the first portion of the data packet, LIC 330 determines at step 706a whether the entire received data packet has been stored. If storage of the entire packet has been completed, the process ends at step 706e. Otherwise, the process resumes at step 706b with a request to link list manager 316 for another memory page for storing a next portion of the received data packet. Upon receipt of an indication that another memory page is available from linked list manager 316, line interface circuit 330 transmits a next portion of the received data packet to the buffer manager at step 706c. The process then again checks to see if the data packet has been fully store at step 706d, and if not, resumes at step 706b. Once storage of the entire packet has been completed, the process ends at step 706e.

FIG. 7B illustrates actions undertaken by linked list manager 316 to store a received data packet. These actions complement the actions of LIC 330 illustrated in FIG. 7A. Upon receipt of a request for buffer memory from line interface circuit 330 at step 703a of FIG. 7B, linked list manager 316 proceeds to examine free memory list 318 at step 703b to determine whether a free buffer memory page is available. If no page is available, linked list manager 316 informs line interface circuit 330 and ends the process at step 703j. If a free page is identified, linked list manager 316 proceeds to remove the page from free memory list 318 at step 703c and to record its address in a starting record for the linked list.

At step 703d, linked list manager 316 transmits the starting memory page address to LIC 330, which causes LIC 330 to begin to transmit a portion of the received data packet to buffer manager 314. At step 703e, linked list manager 316 waits for a next request from LIC 330 for additional memory space. If the request is not received (either because an end of packet message is transmitted by LIC 330 or because no message is transmitted during a prescribed wait period), the process terminates at step 703j. Otherwise, with the receipt of a memory space request, linked list manager 316 proceeds to determine from free memory list 318 whether a free buffer memory page is available.

If no page is available, linked list manager 316 informs LIC 330 and ends the process at step 703j. If a free page is identified, linked list manager 316 proceeds at step 703g to remove the page from free memory list 318, to record the memory page address in a new linked list record, and to update the pointer field in the previous linked list record to point to the new record. At step 703h, the linked list manager may temporarily mark the pointer field in the new record to indicate that the selected memory page contains the end of the received data packet. The linked list manager then returns to step 703e to wait for a next request from LIC 330 for additional buffer memory space. If a request for a new record is granted, the end of packet mark in the previous record is replaced with a pointer to the new record. If no additional request is received, the end-of-packet marking becomes permanent.

Processes similar to those described in conjunction with FIGS. 7A and 7B may also used by destination LICs 330 for retrieving data packets from the buffer memory.

FIG. 8 illustrates a general structure for a packet tag 860 created by the process of FIG. 7A. Received data packet 850 of FIG. 8 includes a packet header 852 and a packet payload 854. Portions of the packet header 852 are written by a LIC 330 into a tag payload 864 in packet tag 860. In addition to tag payload 864, packet tag 860 includes a tag header 862.

Tag header 862 provides a work space for processing engine 320 during tag processing. Upon its creation, tag header 862 may, for example, identify the receiving LIC 530 of FIG. 5, an associated LIC port 531, and a buffer memory address where the beginning portion of the data packet is stored. As it is processed, tag header 862, may further incorporate a variety of additional pieces of information including but not limited to the identity of a destination LIC and associated port, information indicative of service priority, and various control information.

Tag payload 864 typically includes information from packet header 852 that will be used to update the associated data packet before it is retransmitted by a LIC 530 over the data network. In an Internet protocol (IP) environment, for example, tag payload 864 may include IP source and destination addresses as well as transmission control protocol (TCP) source and destination port addresses.

Figure 9C:
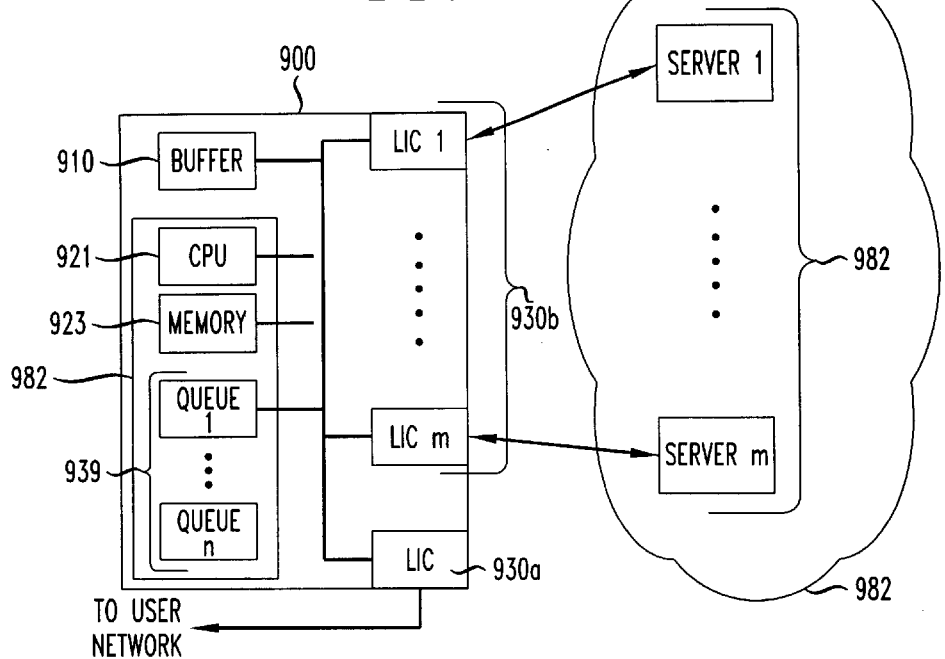

Several examples illustrate by FIGS. 9A–9E illustrate how data tags are formed for a variety of edge router service applications. FIGS. 9A and 9B illustrate how a packet tag 970 may be used to support Ethernet-to-Ethernet communications.

FIG. 9A illustrates a typical Ethernet-based Intranet 970. Intranet 970 includes network backbone 971, routers 973, 977 and 979, and a server 975. Routers 977 and 979 provide connectivity to networks 976 and 978, respectively. Each of the routers 973, 977 and 979 is able to route a data packet within the Intranet 970 by determining a next hop address associated with one of the other routers or with the server 975.

Consistent with the principles of the present invention, FIG. 9B illustrates a packet tag 960 that is organized to facilitate determining a next hop address used for routing data packets in the intranet 970 of FIG. 9A. As illustrated in FIG. 9B, packet tag 960 includes a header portion 962 and a payload portion 964. Payload portion 964 includes Ethernet and TCP/IP addresses for an associated data packet source and destination. With respect to one of the routers 973, 977 and 979 of FIG. 9A that has received the data packet for routing, header portion 962 of FIG. 9B includes a field 961 for source and destination LIC addresses, a field 963 for source and destination LIC port addresses, a control flag field 965, a starting buffer address field 967, and a next hop address field 969.

Ethernet and TCP/IP addresses stored in payload portion 964 may be used to compute next hop address 969. For example, consider a data packet that is being processed by router 973 of FIG. 9A. Processing engine 320 of FIG. 3A associated with router 973 performs a table look-up in an TCP/IP address table stored in one of its memories 323 to determine that the TCP/IP destination address of the data packet is associated with network 976. Processing engine 320 then performs a second table look-up in a router map table stored in one of its memories 323 to determine that router 977 provides intranet interconnection to network 976. The Intranet address for router 977 is determined and written by processing engine 320 into header portion 962 as next hop address 969. It should be noted that a variety of known methods for fast table look-ups (including, for example, hashing) may be employed to ensure satisfactory processing speeds by processing engine 320 (such methods are described, for example, in M. Degermark et al., "Small Forwarding Tables for Fast Routing Lookups," and M. Waldvogel et al., "Scalable High Speed IP Routing Lookup," Proceedings of SIGCOMM, September 1997).

Processing engine 320 next determines a destination LIC address and destination port address on the basis of next hop address 969. Processing engine 320 performs a third table look-up to determine one or more LICs and LIC ports that provide physical interconnection to router 977, and then performs a fourth table look-up to select among physically interconnected LICs and LIC ports on the basis of class of service or utilization. Alternatively, as illustrated in FIG. 3B, a physically interconnected LIC and LIC port may be selected on the basis of a "next available" signal provided by the associated LIC 330 over signal paths 337.

In addition to processing tasks associated with header portion 962, processing engine 320 also appropriately updates payload portion 964. For example, processing engine 320 may complete routine processing tasks such as decrementing the time to life (TTL) field of the TCP/IP header. Once processing of packet tag 970 has been completed, it is forwarded to the selected LIC 330 of FIG. 3. Selected LIC 330 receives the updated packet tag, retrieves the associated data packet from buffer 310 beginning with starting buffer memory address 967, and modifies the retrieved data packet in accordance with information in the updated data tag 970. For example, the data packet may be modified by replacing the stored TCP/IP header with an updated TCP/IP header from the packet tag 970.

Control flag field 965 is used primarily for recording information related to the processing of packet tag 970 by the individual PPMs 322 comprising processing engine 320 and the destination LICs 330. For example, a first PPM 322 may set a flag in control flag field 965 that instructs a subsequent PPM 322 to "skip" its processing of packet tag 970. This would be appropriate, for example, when subsequent PPM 322 is programmed to select a destination LIC on the basis of class of service and the first PPM 322 has determined that packet tag 970 has a premium class of service and is entitled to be delivered to the next available destination LIC.

Control flag field 965 of packet tag 970 may also be used, for example, to store a control flag for destination LIC 330 indicating that the associated data packet should be retrieved from buffer memory 310 and discarded. This would be appropriate when packet tag 970 is associated with a source that has exceeded its authorized packet transfer rate.

Figure 9D:
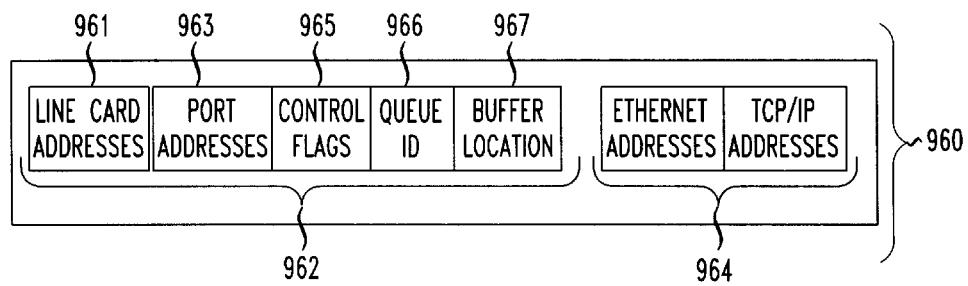

FIGS. 9C and 9D illustrates a second example of how the present invention may be used to direct data packets for service within a server farm. FIG. 9C shows server farm 980 including servers 982. Each of the servers 982 performs similar processing functions, and is electrically interconnected to router 900 via one of m LICs 930b. Any number of servers 982 may be supported by this arrangement so long as each server 982 is associated with a LIC 930b.

Consistent with the principles of the present invention, FIG. 9D illustrates a packet tag 960 that is organized to facilitate distributing data packets among servers 982. As in the example of FIG. 9B, packet tag 960 includes a header portion 962 and a payload portion 964. However, the header portion 962 of FIG. 9D differs from the header portion 962 of FIG. 9B. Specifically, in header portion 962 of FIG. 9D, next hop address field 969 is omitted and queue ID field 966 is added.

Processing engine 920 performs a table look-up in a TCP/IP address table stored in a memory 923 to assign a service priority for the associated data packet. Based upon the assigned service priority, processing engine 920 performs a second table look-up to select a server 982 associated with the assigned service priority, and performs a third table look-up to select a destination LIC address and a destination LIC port that provide interconnection to the selected server 982. Processing engine 920 then respectively writes the addresses of the selected LIC 930b and LIC port in LIC field 961 and LIC port field 963 of packet tag 960.

Processing engine 920 then performs a fourth table look-up to select one of the queues 939 based on the assigned service priority, and writes the selected queue address in queueID field 966 of packet tag 960. Each of the queues 939 has an associated waiting time to service packet tags placed in the queue, and may be associated with a specified service priority. Processing engine 920 then uses the address in queueID field 966 to place packet tag 960 in the selected queue 939 to await further processing.

Figure 9E:
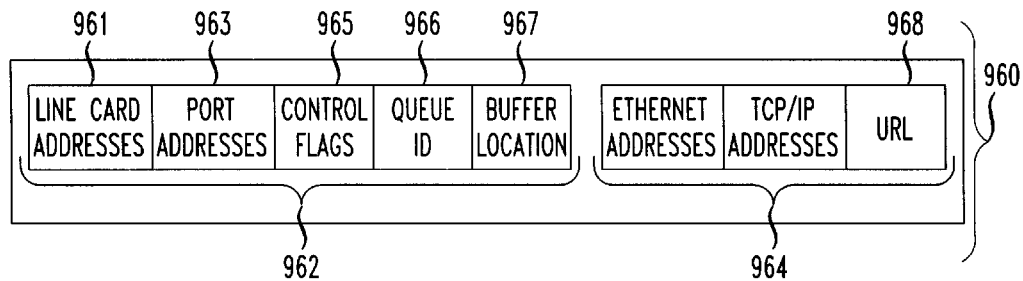

FIG. 9E illustrates a third example in which packet tag 960 is arranged to support a so-called "layer 7" switching feature in the router 900 of FIG. 9C. Layer 7 switching may be used as illustrated to determine service priority for an internet web transaction on the basis of a web page address (referred to as a "uniform resource locator," or URL) provided by the user. As in the example of FIG. 9D, packet tag 960 of FIG. 9E includes a header portion 962 and a payload portion 964. Data fields in the header portions 962 of FIGS. 9D and 9E are equivalent. However, the payload portion 964 of FIG. 9E in comparison to FIG. 9D adds a URL field 968. The URL may be retrieved, for example, from a "Get URL" user command field typically positioned in the data packet payload after the TCP/IP header.

In contrast to the example of FIG. 9D, processing engine 920 performs a table look-up in a memory 923 of FIG. 9C to assign a service priority for the associated data packet on the basis of the URL stored in field 968 rather than on the basis of the TCP/IP addresses stored in payload portion 964. As the number of URLs used should be substantially less than the number of users having distinct TCP/IP addresses, processing engine performance in determining service priority may be significantly improved over the example of FIG. 9D.

The exemplary embodiments described above are but a number of alternative embodiments of the invention that will be apparent to those skilled in the art in view of the foregoing description. Accordingly, this description is to be construed as illustrative only, and is for the purpose of teaching those skilled in the art the best mode of carrying out the invention. Various other alternatives can be devised by a worker skilled in the art without departing from the teachings of this invention.

I claim:

1. A data communications router for routing data packets in a data communications network, each data packet including a header and an associated payload, the router comprising:

a buffer for storing data packets;

a processing engine arranged to process header information; and one or more line interface cards, wherein each of the one or more line interface cards is configured to receive one or more data packets from at least one data network interconnection, to create a packet tag for each received data packet that includes information from the received data packet header, to deliver a copy of each packet tag to the processing engine for processing, to store each received data packet in the buffer, to retrieve a stored data packet from the buffer in response to receiving the associated packet tag from the processing engine, and to route the retrieved data packets over the at least one data network interconnection in accordance with information provided in the processed packet tag;

whereby the storing of a data packet by one of the one or more line interface cards and the processing of an associated packet tag by the processing engine are accomplished approximately coincidently.

2. The router of claim 1, wherein the processing engine includes one or more delivery queues each having a known latency, such that each processed packet tag is assigned to one of the one or more delivery queues based on an assigned priority recorded in the processed packet tag.

3. The router of claim 1, wherein the information provided by the processed packet tag causes the retrieved data packet to be discarded rather than routed by the line interface circuit.

4. The router of claim 1, wherein the processing engine includes at least two central processing unit modules serially arranged as a pipeline.

5. The router of claim 4, wherein each serially arranged pair of the at least two modules includes a buffer interconnecting each module in the pair.

6. The router of claim 4, wherein the processing engine further includes a system controller for controlling the at least two modules.

7. The router of claim 6, wherein the system controller is configured to process packet tags associated with control and signaling data packets.

8. The router of claim 6, wherein each of the at least two modules includes stored program control software for controlling the operation of the module.

9. The router of claim 8, wherein the stored program control software is downloaded to each module by the system controller.

10. The router of claim 8, wherein each module includes a memory for storing its stored program control software.

11. The router of claim 10, wherein each module further uses its memory for storing and retrieving processing data.

12. The router of claim 11, wherein processing data stored by one of the at least two modules is transferred by the module to the system controller.

13. The router of claim 10, wherein processing data is transferred by the system controller to be stored in the memory of one of the at least two modules.

14. The router of claim 6, further comprising a bridge router for interconnecting the system controller with the at least two modules.

15. The router of claim 1, wherein the packet tag includes a header portion and a payload portion.

16. The router of claim 15, wherein the header portion stores information produced by the processing engine that pertains to the processing of the packet tag and routing of the associated stored data packet.

17. The router of claim 1, wherein the retrieved data packet is modified by the retrieving line interface card prior to routing the retrieved data packet.

18. The router of claim 17, wherein the packet header is modified.

19. The router of claim 1, further comprising at least two line interface cards and a multiplexer for sequencing packet tags created by each of the at least two line interface circuits for delivery to the processing engine.

20. The router of claim 19, wherein the multiplexer includes one or more buffers for sequencing delivery of packet tags to the processing engine.

21. The router of claim 1, further comprising at least two line interface cards and a demultiplexer for sequencing delivery of packet tags processed by the processing engine to each of the at least two line interface circuits.

22. The router of claim 21, wherein the demultiplexer includes one or more buffers for sequencing delivery of processed packet tags to the at least two line interface cards.

23. The router of claim 1, wherein functions performed by the processing engine are selected from the group consisting of packet recognition, packet classification, network address translation, routing, scheduling, quality of service functions, traffic monitoring and accounting, traffic billing and accounting, server load balancing and layer 7 switching.

24. The router of claim 1, wherein the first buffer further includes:
a buffer memory for storing data packets;
a buffer manager for moving data packets between the buffer memory and the one or more line interface cards;
a linked list manager for providing the buffer manager with buffer memory space for storing and retrieving data packets; and
a free memory list used by the link list manager to identify free memory space for storing data packets.

25. The router of claim 24, wherein buffer memory space for storing data packets is assigned by the linked list manager in 64 byte pages.

26. The router of claim 1, further comprising one or more adjunct processors, the adjunct processors each being operable to receive data packets from the buffer, modify the received packets and store the modified packets in the buffer.

27. The router of claim 26, wherein at least one of the one or more adjunct processors is an encryption/decryption processor, the encryption/decryption processor being operable to perform one or more functions selected from the group consisting of decryption, decompression, encryption and compression.

28. A method for routing a plurality of data packets in a data communications network, each of the plurality of packets including a header and an associated payload, the method comprising the steps of:
receiving a data packet at a first data communications network interface;
creating a packet tag including selected information from the data packet header;
storing the data packet in a buffer;
processing the packet tag;
retrieving the data packet from the buffer; and
routing the retrieved packet to a second data communications network interface in accordance with information contained in the processed packet tag.

29. The method of claim 28, wherein the storing step and the processing step occur are approximately coincident.

30. The method of claim 28, wherein the routing step is replaced by the step of discarding the retrieved packet tag.

31. The method of claim 28, wherein the processing step includes the step of placing the processed packet tag in a selected one of one or more delivery queues, such that selection is based on an assigned data packet priority recorded in the processed packet tag.

32. The method of claim 28, including the additional step of modifying the retrieved data packet based on information provided by the processed packet tag.

33. The method of claim 32, wherein the modifying step includes the steps of replacing portions of the retrieved data packet header with information provided by the processed packet tag.

34. The method of claim 28, wherein the first data communications network interface and second data communications-network interface comprise a single network interface.

35. The method of claim 28, wherein the processing step includes processing the packet tag by each of at least two central processing unit modules serially arranged as a processing pipeline.

36. The method of claim 35, wherein each of the at least two central processing units performs a unique and predetermined processing function.

37. The method of claim 36, wherein processing functions performed by the processing engine are selected from the group consisting of packet recognition, packet classification, network address translation, routing, scheduling, quality of service functions, traffic monitoring and accounting, traffic billing and accounting, load balancing and layer 7 switching.

* * * * *